United States Patent Office 3,732,264
Patented May 8, 1973

3,732,264
3-ALKOXY-α,β-UNSATURATED ACIDS AND ESTERS
John W. Baum, Palo Alto, and Donald W. Erickson, Cupertino, Calif., assignors to Zoecon Corporation, Palo Alto, Calif.
No Drawing. Filed Nov. 12, 1971, Ser. No. 198,418
Int. Cl. C07c *59/22, 69/66;* A01n *9/24*
U.S. Cl. 260—408                    16 Claims

ABSTRACT OF THE DISCLOSURE

Novel aliphatic α,β-unsaturated esters and acids having a lower alkoxy group at C–3 and synthesis thereof, which are useful for the control of insects.

---

This invention relates to novel aliphatic unsaturated esters and acids having a lower alkoxy group at C–3, the synthesis thereof, and the control of insects. More particularly, the aliphatic unsaturated esters and acids of the present invention are represented by the following formula A:

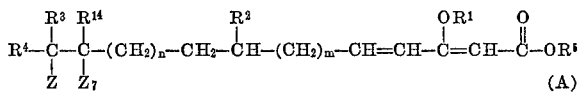

(A)

wherein, each of $m$ and $n$ is zero or the positive integer one, two or three;
$R^1$ is lower alkyl of one to five carbon atoms;
$R^2$ is lower alkyl;
each of $R^3$ and $R^{14}$ is hydrogen or lower alkyl;
$R^4$ is alkyl;
$R^5$ is hydrogen, lower alkyl, cycloalkyl, aryl or aralkyl;
Z is hydrogen, lower alkyl, bromo, chloro, fluoro, or the group —OR in which R is hydrogen, lower alkyl, cycloalkyl, aryl, aralkyl or carboxylic acyl; and Z′ is hydrogen or taken with Z forms a carbon-carbon bond.

The compounds of Formula A are useful for the control of insects. The utility of these compounds as insect control agents is believed to be attributable to their juvenile hormone activity. They are preferably applied to the immature insect, namely—during the embryo, larvae or pupae stage in view of their effect on metamorphosis and otherwise cause abnormal development leading to death or inability to reproduce. These compounds are effective control agents for Hemipteran such as Lygaeidae, Miridae and Pyrrhocoridae; Lepidopteran such as Pyralidae, Noctuidae and Gelechiidae; Coleopteran such as Tenebrionidae, Crysomelidae and Dermestidae; Dipteran such as mosquitos, flies; Homopteran such as aphids and other insects. The compounds can be applied at low dosage levels of the order of 0.01 μg. to 25.0 μg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to the vapor of the compounds of Formula A. Generally, a concentration of less than 25% of the active compound is employed. The formulations can include insect attractants, emulsifying agents or wetting agents to assist in the application and effectiveness of the active ingredient. In the application of the compounds, there is generally employed a mixture of the C-2,3 trans and cis isomers.

In the description hereinafter, each of $m$, $n$, R–$R^5$, $R^{14}$, Z and Z′ is as defined above, unless otherwise specified. The compounds of the present invention can be prepared according to the following outlined synthesis:

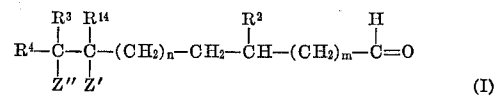
(I)

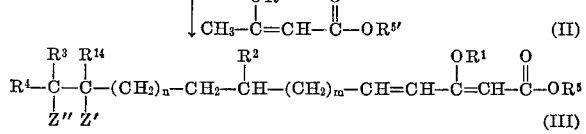
(II)

(III)

In the above formulas, $R^{5\prime}$ is lower alkyl, cycloalkyl, aryl or aralkyl, Z″ is hydrogen lower alkyl, —OR in which R is lower alkyl, cycloalkyl, aryl or aralkyl and Z′ is hydrogen or taken with Z″, a carbon-carbon bond.

In the practice of the above, an aldehyde of Formula I is reacted with a β-alkoxy crotonate of Formula II in the presence of a base to produce an acid of Formula III which is isolated as the free acid and then esterified to prepare esters ($R^5 \neq H$) of Formula III or esterified in situ prior to work-up of the reaction. The reaction is conducted in a suitable solvent such as liquid ammonia, ether solvents, and the like. Base substances useful in the present invention include lithium amides, sodium amide, potassium amide, alkali metals and alkali metal hydride. The reaction of β-alkoxy crotonates with aldehydes has been reported by Smissman and Voldeng, J. Org. Chem. 29 3161 (1964).

The aldehydes of Formula I are commercially available or can be prepared according to known procedures. See U.S. Pats. 3,493,619, 2,902,495, 2,902,510, 3,574,715 and 3,060,237; CA 63: 16394; and application Ser. No. 187,898, filed Oct. 8, 1971 and application Ser. No. 196,800, filed Nov. 8, 1971.

The term "cycloalkyl," as used herein, refers to a cyclic alkyl group of four to eight carbon atoms. The term "aralkyl" refers to a monovalent hydrocarbon group in which an aryl group is substituted for a hydrogen atom of an alkyl group, such as benzyl, xylyl, mesityl, phenylethyl, methylbenzyl, naphthylmethyl and naphthylethyl containing up to twelve carbon atoms. The term "aryl," as used herein, refers to an aromatic group of up to twelve carbon atoms. Typical aromatic groups include phenyl, naphthyl, lower alkylphenyl such as methylphenyl, ethylphenyl t-butylphenyl and isopropylphenyl.

The term "carboxylic acyl," as used herein, refers to the acyl group of a carboxylic acid, anhydride or halide. The acyl group is determined by the particular carboxylic acid halide or carboxylic acid anhydride employed in the esterification. Although no upper limitation need be placed on the number of carbon atoms contained in the acyl group within the scope of the present invention, generally it contains from one to eighteen carbon atoms. Typical esters of the present invention include formate, acetate, propionate, enanthate, benzoate, trimethylacetate, trichloroacetate, trifluoroacetate, 1-butylacetate, phenoxyacetate, cyclopentylpropionate, aminoacetate, β-chloropropionate, adamantotate, octadec-9-enoate, dichloroacetate, butyrate, pentanoate, hexanoate, phenylacetate, p-methylbenzoate, β-phenylpropionate, 3,4-dimethylbenzoate, p-isopropylbenzoate, cyclohexacetate, sterate methylacrylate, p-chloromethylbenzoate, p-methoxybenzoate and p-nitrobenzoate.

The term "alkyl" refers to a branched or straight chain, saturated aliphatic hydrocarbon of one to twelve carbon atoms. The term "lower alkyl" refers to an alkyl group having a chain length of one to six carbon atoms.

The presence of an olefinic bond at position C–2 and C–4 of the compounds of the present invention give rise to four isomers, each of which is embraced by the present invention. As mentioned above, a mixture of isomers is suitably employed for the control of insects such as a mixture containing the trans(2), trans(4) isomer and the cise(2), trans(4) isomer.

The following examples are provided to illustrate the practice of the present invention. Temperature is given in degrees centigrade.

EXAMPLE 1

To a suspension of 0.2 mole of lithium amide (from 1.39 g. Li) in about 300 ml. of dry liquid ammonia is added a solution of 14.4 g. (0.10 mole) ethyl cis 3-methoxycrotonate in 20 ml. of dry ether. The mixture is stirred for about 10 minutes after addition is complete. A solution of 18.63 g. of 0.10 mole) of freshly distilled 7-methoxy-3,7-dimethyloctan-1-al in 20 ml. of dry ether is added and the reaction mixture stirred for about one hour. The ammonia is evaporated and replaced by 300 ml. of ether. The mixture is refluxed for about 5 minutes, allowed to cool and 200 ml. of ice-water added. The aqueous phase is separated and washed with ether. The aqueous phase is cooled in an ice-bath and carefully acidified to pH[6] with dilute sulfuric acid. The crude acid (3,11-dimethoxy-7,11-dimethyldodeca-2,4-dienoic acid) is isolated by extracting with ether. The ether phase is washed with saturated brine, dried over magnesium sulfate and diazomethane in ether added with stirring until the yellow color of the diazomethane persists. Stirring is continued for about 15 minutes after addition is complete and then the ether solvent removed by evaporation under reduced pressure to give methyl 3,11-dimethoxy-7,11-dimethyl-dodeca-2(cis), 4(trans)-dienoate which is purified by chromatography.

The above prepared cis(2), trans(4) ester is equilibrated with the corresponding trans(2), trans(4) isomer as follows: A mixture of 31.45 g. (1.10 mole) of the dienoate and 10.81 g. (0.102 mole) of trimethylorthoformate and 3 drops of concentrated sulfuric acid is stirred for 24 hours and then quinoline is added to neutralize the sulfuric acid. The mixture is then fractionally distilled at reduced pressure to separate methyl 3,11-dimethoxy-7,11-dimethyldodeca-2(trans), 4(trans)-dienoate which is further purified by chromatography.

EXAMPLE 2

To a suspension of 7.8 g. of sodium amide in 50 ml. of dry ether is added slowly 13.65 g. of methyl 3-methoxycrotonate followed by slow addition of 14.66 g. of 3,7-dimethyloctan-1-al with stirring and cooling in ice-water. When addition is complete, the reaction mixture is allowed to stand for about 24 hours at room temperature and then 100 ml. of ethanol is added followed by 100 ml. of water. The mixture is concentrated by evaporation by heating to remove ether and ethanol and then extracted with ether. The aqueous phase is acidified with sulfuric acid and then extracted with ether. The ether extract is washed with brine and dried to yield 3-methoxy-7,11-dimethyldodeca-2,4-dienoic acid which is esterified by addition of diazomethane in ether (1.2 molar equivalents) and stirring. The ether is removed by evaporation under reduced pressure to give crude methyl 3-methoxy-7,11-dimethyldodeca-2,4-dienoate which can be purified by chromatography and equilibrated with essentially all trans(2), trans(4) isomer using the procedure of Example 1. Alternatively, the trans(2), trans(4) isomer can be prepared by treating the ester with a very small amount of iodine and exposure to room light.

EXAMPLE 3

To a mixture of 5.3 g. of potassium amide in 150 ml. of liquid ammonia is slowly added 6.05 g. of ethyl 3-methoxycrotonate and then 6.36 g. of 3,7-dimethyloct-6-en-1-al is added, with stirring. After addition is complete, the reaction mixture is allowed to stand 24 hours and then then ammonia is evaporated off. Methanol (100 ml.) is added followed by 10 ml. of water and the mixture refluxed for 45 minutes. Additional water (about 60 ml.) is added after cooling and solvent removed by evaporation. The concentrate is extracted with ether and the aqueous phase acidified with sulfuric acid and extracted with ether. The ether extract is washed with brine, dried and ether removed to yield 3-methoxy-7,11-dimethyldodeca-2,4,10-trienoic acid.

EXAMPLE 4

To 1.2 g. of 3-methoxy-7,11-dimetyldodeca-2,4,10-trienoic acid and 20 ml. of dry benzene is added 0.60 ml. of oxalyl chloride at room temperature with stirring. After about one hour, isopropanol (4 ml.) is added and the mixture allowed to stand for 2 hours. Ether and saturated sodium bicarbonate is added and the organic phase separated. The organic phase is washed with aqueous sodium bicarbonate and brine, dried over calcium sulfate and evaporated to give isopropyl 3-methoxy-7,11-dimethyl-dodeca-2,4,10-trienoate.

Using the above process, there is prepared isopropyl 3-methoxy-7,11-dimethyldodeca-2,4-dienoate and isopropyl 3,11-dimethoxy - 7,11 - dimethyldodeca-2,4-dienoate from the respective free acid.

EXAMPLE 5

To a solution of 2 g. of isopropyl 3-methoxy-7,11-dimethyldodeca-2,4,10-trienoate in 30 ml. of isopropanol, cooled to 0° and under nitrogen, is added 4.90 g. of acetyl chloride dropwise. After addition is complete, the ice-bath is removed and the reaction mixture stirred at room temperature for about 36 hours. Isopropanol is removed by evaporation and the residue poured into hexane-water. The hexane layer is washed with aqueous sodium bicarbonate, water and brine, dried over calcium sulfate and solvent evaporated to give isopropyl 11-chloro-3-methoxy-7,11-dimethyldodeca-2,4-dienoate which can be further purified by chromatography.

EXAMPLE 6

The process of Example 4 is repeated using 3-methoxy-7,11-dimethyldodeca-2,4-dienoic acid and each of methanol, ethanol t-butanol and s-butanol in place of isopropanol to prepare methyl 3-ethoxy-7,11-dimethyldodeca-2,4-dienoate,
ethyl 3-methoxy-7,11-dimethyldodeca-2,4-dienoate,
t-butyl 3-methoxy-7,11-dimethydodeca-2,4-dienoate, and
s-butyl 3-methoxy-7,11-dimethyldodeca-2,4-dienoate, respectively.

EXAMPLE 7

Each of 3,7,7-trimethyloctan-1-al, 7-ethoxy-3,7-dimethyloctan-1-al, 3,6,7-trimethyloctan-1-al and 2,5-dimethylhexan-1-al is reacted with ethyl β-methoxycrotonate using lithium amide to prepare first the acid, i.e.

3-methoxy-7,11,11-trimethyldodeca-2,4-dienoic acid,
3-methoxy-7,11-dimethyl-11-ethoxydodeca-2,4-dienoic acid,
3-methoxy-7,10,11-trimethyldodeca-2,4-dienoic acid, and
3-methoxy-6,9-dimethyldeca-2,4-dienoic acid, each of which is reacted with diazoethane prior to isolation to give the respective ethyl ester ethyl 3-methoxy-7,11,11-trimethyldodeca-2,4-dienoate,
ethyl 3-methoxy-7,11-dimethyl-11-ethoxydodeca-2,4-dienoate,
ethyl 3-methoxy-7,10,11-trimethyldodeca-2,4-dienoate and
ethyl 3-methoxy-6,9-dimethyldeca-2,4-dienoate.

EXAMPLE 8

To a mixture of 1.9 g. of mercuric acetate, 6 ml. of water and 20 ml. of tetrahydrofuran is added 1.5 g. of ethyl 3-methoxy 7,11-dimethyldodeca-2,4,10-trienoate, slowly, with cooling in an ice-bath. After addition is complete, the reaction is stirred for about 20 minutes at room temperature and then is cooled to 0°–5° and 6 ml. of aqueous NaOH (3 molar) is added followed by 0.49 g.

of sodium borohydride in 10 ml. of aqueous NaOH (3 molar). The mixture is stirred briefly (about 15 minutes) and then decanted and concentrated by evaporation. The concentrate is diluted with water and extracted with ether. The ether extract is washed with water, dried over magnesium sulfate and evaporated to give ethyl 3-methoxy-11-hydroxy-7,11-dimethyldodeca - 2,4 - dienoate which can be purified by chromatography and distillation.

A mixture of 2 g. of ethyl 3-methoxy-11-hydroxy-7,11-dimethyldodeca-2,4-dienoate, 15 ml. of acetyl chloride and 20 ml. of dry pyridine, under nitrogen, is heated on a steam bath for 2 hours. After cooling, the mixture is concentrated under reduced pressure and the residue taken up in ether. The ether extract is washed, dried over calcium sulfate and evaporated to give ethyl 3-methoxy-11-acetoxy-7,11-dimethyldodeca-2,4-dienoate.

What is claimed is:

1. A compound selected from the following Formula A:

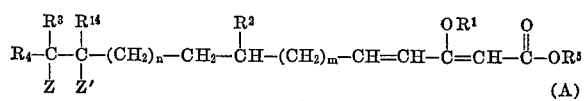

(A)

wherein,
each of $m$ and $n$ is zero or the positive integer one;
$R^1$ is lower alkyl of one to five carbon atoms;
$R^2$ is lower alkyl;
each of $R^3$ and $R^{14}$ is hydrogen or lower alkyl;
$R^4$ is lower alkyl;
$R^5$ is hydrogen, lower alkyl, cycloalkyl, aryl or aralkyl;
Z is hydrogen, lower alkyl, bromo, chloro, fluoro, or the group —OR in which R is hydrogen, lower alkyl, cycloalkyl, aryl, aralkyl or acetyl; and Z' is hydrogen or taken with Z forms a carbon-carbon bond.

2. A compound of claim 1 wherein each of $R^1$, $R^2$, $R^3$ and $R^4$ is methyl or ethyl; $R^{14}$ is hydrogen or methyl; $R^5$ is hydrogen or lower alkyl; $m$ is one; $n$ is zero or one; and Z is hydrogen, methyl, ethyl, chloro or —OR in which R is hydrogen or lower alkyl of one to four carbon atoms.

3. A compound of claim 2 wherein $R^1$ is methyl.

4. A compound of claim 2 wherein each of $R^1$, $R^2$, $R^3$ and $R^4$ is methyl.

5. A compound of claim 4 wherein each of Z and Z' is hydrogen.

6. A compound of claim 5 wherein $n$ is one; $R^{14}$ is hydrogen; and $R^5$ is methyl, ethyl, isopropyl or t-butyl.

7. A compound of claim 4 wherein Z' is hydrogen and Z is methoxy or ethoxy.

8. A compound of claim 7 wherein $n$ is one, $R^{14}$ is hydrogen; and $R^5$ is methyl, ethyl, isopropyl or t-butyl.

9. A compound of claim 4 wherein Z taken with Z' is a carbon-carbon bond.

10. A compound of claim 9 wherein $n$ is one; $R^{14}$ is hydrogen; and $R^5$ is methyl, ethyl, isopropyl or t-butyl.

11. A compound of claim 4 wherein Z' is hydrogen and Z is methyl or ethyl.

12. A compound of claim 11 wherein $m$ is one; $R^{14}$ is hydrogen; and $R^5$ is methyl, ethyl isopropyl or t-butyl.

13. A compound of claim 4 wherein Z' is hydrogen and Z is chloro.

14. A compound of claim 13 wherein $n$ is one; $R^{14}$ is hyrogen; and $R^5$ is methyl, ethyl, isopropyl or t-butyl.

15. A compound of claim 4 wherein $R^5$ is hydrogen or lower alkyl; $n$ is one; $R^{14}$ is hydrogen; Z is hydrozen, methyl, ethyl methoxy or ethoxy; and Z' is hydrogen or taken with Z, a carbon-carbon bond.

16. A compound of claim 15 wherein $R^5$ is hydrogen, methyl or ethyl.

References Cited

UNITED STATES PATENTS

| | | | |
|---|---|---|---|
| 3,028,422 | 4/1962 | Eiter et al. | 260—514 |
| 3,032,491 | 5/1962 | Barton et al. | 204—158 |

LEWIS GOTTS, Primary Examiner

D. G. RIVERS, Assistant Examiner

U.S. Cl. X.R.

260—405, 410, 410.5, 410.9 R, 413, 484 R, 535 R, 601 R, 601 H; 424—312, 318, DIG. 12